United States Patent Office 3,822,999
Patented July 9, 1974

3,822,999
LIQUID-LIQUID EXTRACTION AND PLUG-FLOW REACTOR APPARATUS
Bill J. Pope, Provo, Utah, assignor to Brigham Young University, Provo, Utah
Filed Mar. 30, 1972, Ser. No. 239,578
Int. Cl. B01d 11/04
U.S. Cl. 23—270.5                     1 Claim

ABSTRACT OF THE DISCLOSURE

Liquid-liquid extraction and plug-flow reactor apparatus comprising a vertical column having a plurality of alternately stationary and rotatable perforated plates or disks in spaced relation. A comparatively heavy liquid phase is passed from the top to the bottom of the vertical column and a comparatively light liquid phase is passed from the bottom to the top of the column in counter-current flow. Droplets are formed as the liquid phases pass through the perforations. The rotating perforated plates advantageously shear the droplets to form many new interfacial surfaces. The stationary and rotatable perforated plates both extend across essentially the entire diameter of the vertical column so that liquid is forced to pass through apertures in the plates. Accordingly, backmixing has been found to be substantially reduced and separation efficiency increased. The combination of good radial mixing and limited axial or backmixing makes the apparatus especially well-suited for use as a plug-flow reactor.

BACKGROUND

Field of the Invention

The invention relates to an improved extraction apparatus and plug-flow reactor which improves liquid-liquid contact and reduces backmixing.

The Prior Art

A common operation in practical organic chemistry is the separation of an organic substance which is dissolved or suspended in a liquid. The separation is facilitated by shaking the liquid solution or suspension with a second solvent in which the organic compound is soluble. The second solvent is selected to be immiscible (or nearly immiscible) with the liquid containing the organic substance. The liquid from which the organic substance is to be extracted is generally water, although other liquids could be used. For convenience of nomenclature, the systems described throughout this specification will comprise an aqueous phase and an organic phase.

A number of solvents are frequently employed for extraction, these solvents including methyl isobutyl ketone, diethyl ether, di-isopropyl ether, benzene, chloroform, carbon tetrachloride, petroleum ether and a host of other less widely used solvents. The solvent selected will depend upon the solubility of the substance to be extracted in that solvent and upon the ease with which the solvent can be separated from the solute.

In order to take advantage of this extraction phenomenon, a wide variety of counter-current contactors for separation processes have been developed. Most of these counter-current contactors have differential elements which are orthogonal to the bulk flow axis. The goal in the construction of most contactors is to achieve perfect phase mixing and to minimize or eliminate axial backmixing. Phase mixing is advantageous because at each organic-aqueous interface, solute migrates from the aqueous to the organic phase.

It is well-known, however, that the rate of migration of the solute is dependent, in part, upon the concentration of the solute on the organic side of the interface. If there is a high concentration of solute, the migration from the aqueous to the organic phase will be significantly reduced and, therefore, the efficiency of the extraction will be likewise reduced. Phase mixing tends to break up concentrations of solute at the aqueous-organic interface so that migration of the solute can be accommodated more rapidly and efficiently.

Once the solute has migrated to the organic phase, it tends to remain in the organic phase partially because of preferential solubility and partially because as the organic phase moves counter-current to the aqueous phase, the orgnic phase is continuously exposed to a high concentration of solute in the aqueous phase. Historically, however, prior art contactors cause a portion of the aqueous and/or organic phase to be displaced counter to its original direction of flow. This condition is known in the art and defined herein as backmixing. Whenever solute-laden organic phase is subjected to backmixing, the solute-laden organic phase is exposed to aqueous phase having ever decreasing concentrations of solute.

Even where there is preferential solubility in the organic phase, high organic-aqueous concentration differentials will cause the solute in the organic phase to migrate back into the aqueous phase. Thus, backmixing is always undesirable in extraction.

Many of the known prior art apparatus have recognized the value of rotating disks for phase mixing. For example, see U.S. Pat. 2,601,674 which discloses a rotating disk column including a number of rotating disks supported upon a shaft. The rotors are centered between donut-shaped stator rings. A similar mixing effect for paint is disclosed in U.S. Pat. 2,734,728.

Nevertheless, high phase mixing frequently results in undesirable backmixing which reduces the efficiency of the apparatus. Until this present invention, no extraction and plug-flow reaction apparatus has been known which simultaneously accommodates a high level of phase mixing with little or no axial backmixing.

In numerous chemical reactions, the reaction product is adversely affected by one or more of the reactants. For example, in the reaction of butene and isobutane, isooctane is formed. Conventionally, this reaction is performed in a large vessel where the degree of backmixing is high.

It has been found that a large excess of isobutane must be provided to minimize undesirable reaction of isooctane with butene to form isododecane and other undesirable higher molecular weight products in the backmixing reactor. The required use of a large excess of isobutane can be avoided only by using a contactor having a high degree of radial mixing while at the same time preventing axial backmixing.

BRIEF DESCRIPTION AND OBJECTS OF THE INVENTION

The present invention accommodates a surprisingly high level of radial mixing developing liquid droplets which are repeatedly sheared by action of the apparatus to expose new interfacial surfaces for reaction or solute transfer. In addition, fluid flow is restricted to fluid paths through structural members intersecting the flow axis thereby substantially reducing backmixing.

It is, therefore, a primary object of the present invention to provide an improved apparatus for maximizing liquid-liquid radial mixing with reduced backmixing.

It is another primary object of the present invention to provide an improved counterflow extraction contactor column for immiscible liquids.

One still further object is to provide an improved plug-flow reactor providing improved radial mixing and reduced axial backmixing.

These and other objects and features of the present invention will become more fully apparent from the following description and appended claim taken in conjunction with the accompanying drawings.

DETAILED DESCRIPTION OF THE PREFERRED EMBODIMENT

Figure 1:
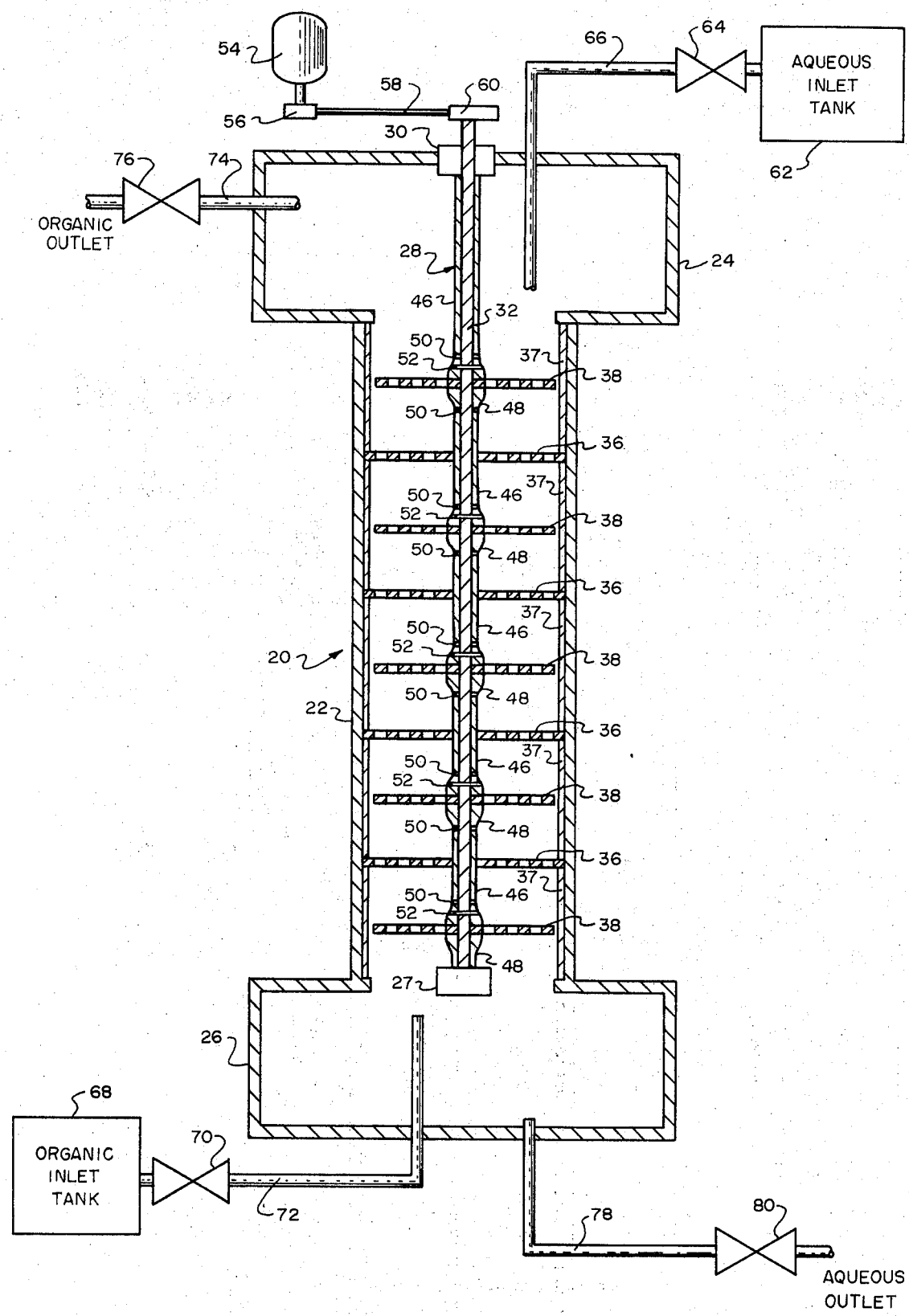
FIG. 1 is a fragmentary schematic view of the presently preferred counter-current contactor embodiment of the invention.
Figure 2:
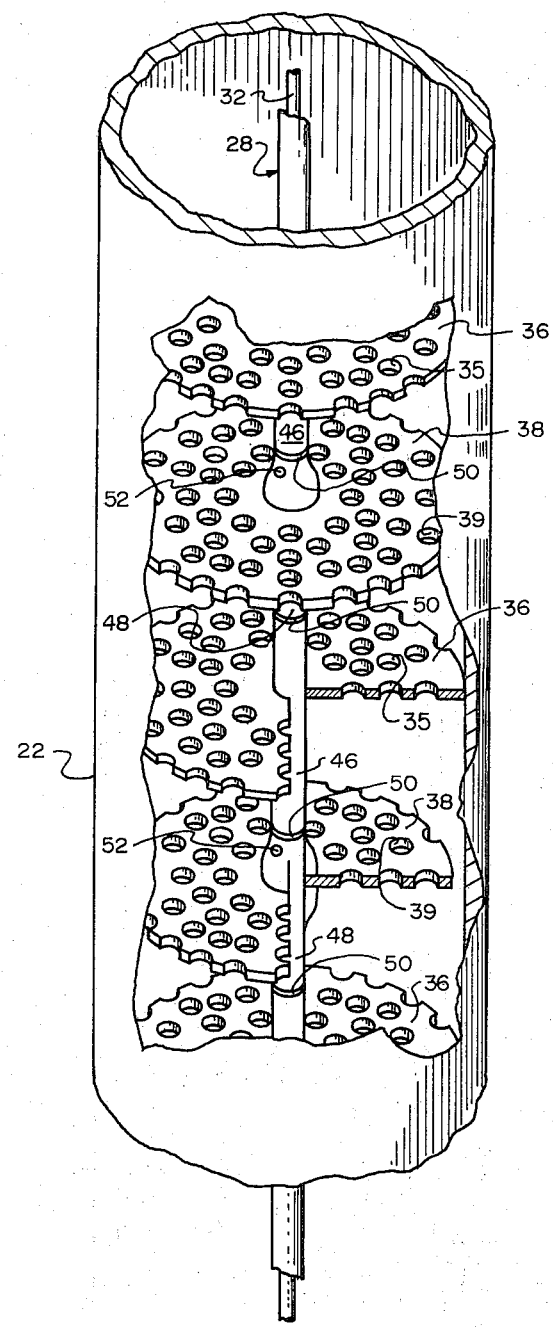
FIG. 2 is an enlarged fragmentary view of the contactor column, parts being broken away to reveal inner members.

Reference is now made to FIGS. 1 and 2 which illustrate a presently preferred embodiment of the invention, like parts having like numerals throughout.

More particularly, the liquid-liquid contactor system generally designated 20 is shown schematically in FIG. 1 illustrating the use of the system 20 as an extraction apparatus. Other uses of the system 20 will be hereafter more fully described. While any suitable immiscible liquids could be used in the extraction system, an aqueous-organic system will be discussed for convenience of illustration.

The system 20 includes a generally vertically oriented cylindrical column 22. The column 22 opens into a diametrally enlarged reservoir 24 at the top and also opens into a diametrally enlarged reservoir 25 at the bottom. Reservoir 24 functions as an after-settler for the organic phase and reservoir 26 functions as an after-settler for the aqueous phase. If desired, the inner phase level in the settler-reservoir 24 may be maintained constant by use of a suitable conventional liquid level controller (not shown).

A central shaft assembly generally designated 28 is directed along the longitudinal axis of the column 22. The shaft assembly terminates just above the settler-reservoir 26 in a thrust bearing 27. Shaft assembly 28 includes segmented spacers 46 in vertically stacked array. The shaft assembly is shown also in FIG. 2. Each of the spacers 46 assists in determining the spacial relationship of stationary disks 36 and rotating disks 38 as will be hereinafter more fully described. Disk 36 is annular in configuration and has a plurality of annular apertures 35 therein (see also FIG. 2). While annular apertures are illustrated, any number and configuration of openings in the disk could be used. The disk 36 has a diametral dimension which is essentially the same as the inside diameter of the column 22 so that all liquid flowing through the column must pass through the apertures 35.

The disks 36 are spaced by annular collars 37 having an inside diameter slightly smaller than the inside diameter of the column 22. The collars 37 are alternated with the disks 36 so that the preferred spacing is maintained and if desired axial pressure can be exerted by a clamp (not shown) to fix the position of the disks 36. Alternatively, any other suitable means including, for example, a key-keyway combination could be used to fix the position of disk 36 relative to the column 22. Further, spacers 46 may be unnecessary where collars 37 are used.

A shaft 32 is centrally disposed along the axis of column 22 and is coaxial with spacers 46. Shaft 32 is journalled at 30 for rotation relative to the column. A plurality of hubs 48 are alternaely interposed between the spacers 46. Bushings 50 may, if desired, be used to reduce friction between hubs 48 and spacers 46. Each of the hubs 48 is connected to a rotor disk 38 having a plurality of annular apertures 39 therein. Other suitable rotor disk designs would include wire-spoked rims, disks made from wire cloth, disks containing triangular perforations or other suitable openings of any desired number. The disk 38 has a diametral dimension which is only slightly smaller than the inside diameter of the column 22. Thus, essentially all of the liquid passing through the column 22 must pass through the apertures 39. It is presently preferred to keep the thickness of disk 38 to a minimum because shearing efficiency is increased inversely with rotor thickness. The shaft 32 is non-rotatably connected to each rotor hub 48 such as with a keeper or pin 52 so that as shaft 32 rotates, the hub 48 and attached rotor disk 38 will also rotate.

With continued reference to FIG. 1, the shaft 32 is rotated by a conventional electric motor 54, the electric motor 54 being connected to the shaft 32 by a drive pulley 56, a drive belt 58 and idler pulley 60. The electric motor 54 can be any suitable AC or DC motor. If desired, the speed of rotation can be accurately regulated by any suitable conventional controller system such as a Clegg motor controller system (not shown).

Aqueous fluid originating at an aqueous inlet tank 62 is conducted to the contactor 20 through conduit 66 which terminates in the lower end of the settler-reservoir 24. A valve 64 regulates the flow rate of aqueous liquid into the column 22. As the aqueous phase traverses the length of the column 22, it settles in the settler-reservoir 26 where it can be easily drained through conduit 78. The drainage through conduit 78 is regulated by valve 80.

Conversely, organic liquid is transferred to the column 22 at the bottom of the column immediately above the settler-reservoir 26. The organic phase is transferred from an organic inlet tank 68 through a valve 70 and conduit 72. The organic phase can be removed from the settler-reservoir 24 through conduit 74. The discharge is regulated by valve 76.

While the inlet conduits 72 and 66 may be conveniently located at any position in the corresponding lower and upper ends of column 22, in the preferred embodiment they are situated essentially 180° one with respect to the other to facilitate liquid flow. It should also be appreciated that conventional flow controllers and flow meters (not shown) may be associated with each of the aqueous and inlet tanks 62 and 68. Also, the aqueous and organic liquid phases in the inlet tanks 62 and 68, respectively, are preferably kept under pressure by conventional pump structure (not shown).

No structural modifications are necessary where the system 22 is used as a plug-flow reactor. The reactants can both be admitted through the conduit 72 and a heavier, immiscible catalyst, if any is used, can be admitted through to conduit 66.

The Method

When the motor 54 is actuated, the shaft 32 will rotate and so also will the connected hubs 48 and rotor disks 38. The aqueous and organic liquid phases are passed in counter-current flow through the column 22 from each corresponding inlet toward each corresponding settler-reservoir. Care should be taken to avoid flooding.

Flooding is defined as a condition in which the upward flow of the organic phase is blocked so that accumulation of organic phase below a perforated disk increases with time. The flooding phenomenon may also occur with the heavy phase above the disk. If flooding is allowed to continue, the organic phase is carried from the bottom through the outlet conduit 78 and the aqueous phase is discharged through the top through the outlet conduit 74. Stability in the column 22 is achieved when the liquid input is below the flooding point. Generally speaking, flooding is a direct function of rotor speed and an inverse function of stator spacing.

As the aqueous and organic phases flow counter-currently, droplets or bubbles of the dispersed phase are formed in the continuous phase. The droplets are formed as a liquid phase passes through the perforations 35 or 39. It has been discovered that much extraction occurs during the formation of new droplets or bubbles. According to the present invention, the droplet formation is accompanied by cutting and shearing action.

As droplets are formed in the perforations 39 of rotors 38, radial momentum is transferred to the droplets. As the droplets impact upon the perforated stator disk 36, the droplets are cut or sheared so as to present new interfacial surfaces. Thus, both rotors and stators are effective in forming new interfacial area. New interfacial surface formation significantly improves conditions for extraction.

Also, because each of the rotors 38 and stators 36 forms a partial barrier across the diameter of the column 22, essentially all of the aqueous and organic phases must pass through the perforations 35 and 39. In the illustrated embodiment of the invention, a generally circular fluid motion is prevented by the perforated stators 36. Because mixing occurs radially at these discrete levels, backmixing is substantially reduced if not eliminated.

The system 20 with good radial mixing and limited axial backmixing is especially well-suited to plug-flow reactions. To obtain reaction conditions approximating plug-flow conditions it is usual to use long tubular reactors. With the system 20 a fairly short tube will suffice. For heterogeneous catalytic reactions where the catalyst is an immiscible fluid counter-current flow of reactant and catalyst offers some definite advantages. For example, the reaction of isobutane with alkenes such as butene in the presence of sulfuric acid catalyst could be carried out advantageously in the system 20. The sulfuric acid enters the top of the column 22 and hydrocarbon reactants enter conduit 72 in the bottom. The reactants and sulfuric acid catalyst contact each other intimately radially at the stator and rotor levels with limited backmixing. As previously described, conventional backmix reactors used for this type of reaction require a large excess of one of the reactants (e.g. isobutane in this example) to minimize the undesirable formation of higher molecular weight products.

In this presently preferred system 20 embodiment, the reacted isooctane does not come in contact with high concentrations of butene because radial mixing occurs at discrete levels in the vicinity of each stator and rotor. Therefore, the amount of recycle reactant (isobutane in this example) can be significantly reduced. Other advantageous applications will become apparent to those skilled in the art.

The invention may be embodied in other specific forms without departing from its spirit or essential characteristics. The described embodiment is to be considered in all respects only as illustrative and not restrictive and the scope of the invention is, therefore, indicated by the appended claim rather than by the foregoing description. All changes which come within the meaning and range of equivalency of the claim are to be embraced within their scope.

What is claimed and desired to be secured by United States Letters Patent is:

1. Apparatus for mixing liquids comprising:
   an elongated vertically oriented hollow column;
   a plurality of stators transversely dividing the column through its longitudinal axis, each of said stators comprising a thin essentially planar disk having an array of apertures defining spaced cutting surfaces for dispersing one liquid in another liquid in the form of bubbles;
   a plurality of thin essentially planar rotors each separated from the other by a thin stator disk and transversely dividing the column through its longitudinal axis and means for revolving the rotors, said rotors comprising an array of apertures defining spaced cutting surfaces for (a) shearing the bubbles to form new interfacial surfaces and (b) imparting sufficient velocity to the bubbles to again shear the bubbles at the stators, the thinness of the stators and rotors minimizing backmixing;
   the column including a plurality of stacked concentric collars defining the vertical space between the stators, each stator being confined between consecutive collars,
   said rotors transecting substantially the entire hollow of the column as defined by the collars.

References Cited

UNITED STATES PATENTS

| | | | |
|---|---|---|---|
| 2,906,606 | 9/1959 | Signer | 23—270.5 |
| 3,013,866 | 12/1961 | Samaniego | 23—270.5 |
| 3,062,627 | 11/1962 | Zuiderweg | 23—270.5 |
| 2,106,366 | 1/1938 | Tijmstra | 23—270.5 |
| 1,993,446 | 3/1935 | Huff | 23—270.5 |
| 1,780,853 | 11/1930 | Walsh | 23—270.5 |
| 2,139,871 | 12/1938 | Wilson | 23—270.5 |
| 1,845,128 | 2/1932 | Cochran | 23—269 |

FOREIGN PATENTS

| | | | |
|---|---|---|---|
| 1,557,437 | 3/1968 | France | 23—270.5 |
| 566,945 | 6/1929 | Germany | 23—270.5 |

NORMAN YUDKOFF, Primary Examiner

S. J. EMERY, Assistant Examiner

U.S. Cl. X.R.

196—14.52